(12) United States Patent
Heithcock et al.

(10) Patent No.: US 8,250,178 B2
(45) Date of Patent: *Aug. 21, 2012

(54) PROTECTING CLIENT-SIDE CODE

(75) Inventors: Jeffery Gordon Heithcock, Lafayette, CA (US); David William Barry, II, El Cerrito, CA (US)

(73) Assignee: EMC Corporation, Hopkinton, MA (US)

( * ) Notice: Subject to any disclaimer, the term of this patent is extended or adjusted under 35 U.S.C. 154(b) by 475 days.

This patent is subject to a terminal disclaimer.

(21) Appl. No.: 11/522,194

(22) Filed: Sep. 15, 2006

(65) Prior Publication Data

US 2008/0071884 A1    Mar. 20, 2008

(51) Int. Cl.
*G06F 15/16* (2006.01)

(52) U.S. Cl. .......................................... 709/219

(58) Field of Classification Search .................. None
See application file for complete search history.

(56) References Cited

U.S. PATENT DOCUMENTS

| | | | |
|---|---|---|---|
| 6,012,083 A | 1/2000 | Savitzky et al. | |
| 6,058,482 A * | 5/2000 | Liu | 726/23 |
| 6,260,078 B1 | 7/2001 | Fowlow | |
| 6,353,850 B1 * | 3/2002 | Wies et al. | 709/203 |
| 6,427,234 B1 | 7/2002 | Chambers et al. | |
| 6,675,230 B1 | 1/2004 | Lewallen | |
| 7,228,540 B2 | 6/2007 | Chan et al. | |
| 7,376,653 B2 * | 5/2008 | Hart, III | 707/10 |
| 2003/0088580 A1 | 5/2003 | Desai et al. | |
| 2003/0217197 A1 | 11/2003 | Chan et al. | |
| 2004/0111730 A1 | 6/2004 | Apte | |
| 2005/0108647 A1 | 5/2005 | Musson et al. | |
| 2006/0069808 A1 * | 3/2006 | Mitchell et al. | 709/246 |
| 2006/0136552 A1 * | 6/2006 | Krane et al. | 709/203 |
| 2007/0016639 A1 | 1/2007 | Mukundan et al. | |
| 2007/0186150 A1 * | 8/2007 | Rao et al. | 715/506 |
| 2007/0299928 A1 * | 12/2007 | Kohli et al. | 709/217 |
| 2008/0005695 A1 * | 1/2008 | Ozzie et al. | 715/811 |
| 2008/0016151 A1 | 1/2008 | Howard et al. | |

* cited by examiner

*Primary Examiner* — Moustafa M Meky
*Assistant Examiner* — Clayton R Williams
(74) *Attorney, Agent, or Firm* — Van Pelt, Yi & James LLP (57) ABSTRACT

Protecting client-side code is disclosed. In some embodiments, when a request for a page is received from a client, an initial definition of the page is provided to the client wherein the initial definition includes a reference to a piece of client-side code not included in the initial definition and a code retrieval logic which, when executed at the client, results in the piece of client-side code being obtained dynamically from an associated server at runtime when the piece of client-side code is desired to be executed at the client. A client receives such an initial definition of a requested page from an associated server of the page. When an indication that the piece of client-side code is desired to be executed is received, the code retrieval logic is executed to obtain the piece of client-side code dynamically from the associated server.

32 Claims, 8 Drawing Sheets

PROTECTING CLIENT-SIDE CODE

BACKGROUND OF THE INVENTION

To date, a server hosting a web page or application typically has provided to a client machine, most commonly in the clear, all of the code that may be required to be executed at the client depending on how the client is used to interact with the web page and/or application. Current web pages and applications, therefore, typically suffer from having a large part of their source code easily exposed at the client-side. For example, web pages may incorporate client-side scripting in their associated HTML files or as include files that can be readily downloaded from an associated server. The source code associated with the implementation of a page or application is typically included in a few files and/or in small pieces inside the associated HTML page and is usually stored on disk at the client-side. The code is often in plain text and is only compiled by an associated browser as needed at the client. As a result, the source code associated with the implementation of a page or application is easily decipherable by anyone who has access to the files associated with the code at the client-side. This code, however, is valuable intellectual property that requires the investment of time and money by the creators.

One existing method for obfuscating the source code associated with a page or application is to parse through the source code and strip out comments and unneeded white spaces and to covert variable and function names to shortened versions. While this makes it more difficult to decipher, de-parsing the downloaded obfuscated code files to determine the underlying source code is still possible.

Therefore, there exists a need for an improved technique to protect client-side code.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Protecting client-side code is disclosed. In some embodiments, when a request for a page is received from a client, an initial definition of the page is provided to the client wherein the initial definition includes a reference to a piece of client-side code not included in the initial definition and a code retrieval logic which, when executed at the client, results in the piece of client-side code being obtained dynamically from an associated server at runtime when the piece of client-side code is desired to be executed at the client. A client receives such an initial definition of a requested page from an associated server of the page. When an indication that the piece of client-side code is desired to be executed is received, the code retrieval logic is executed to obtain the piece of client-side code dynamically from the associated server.

Figure 1:
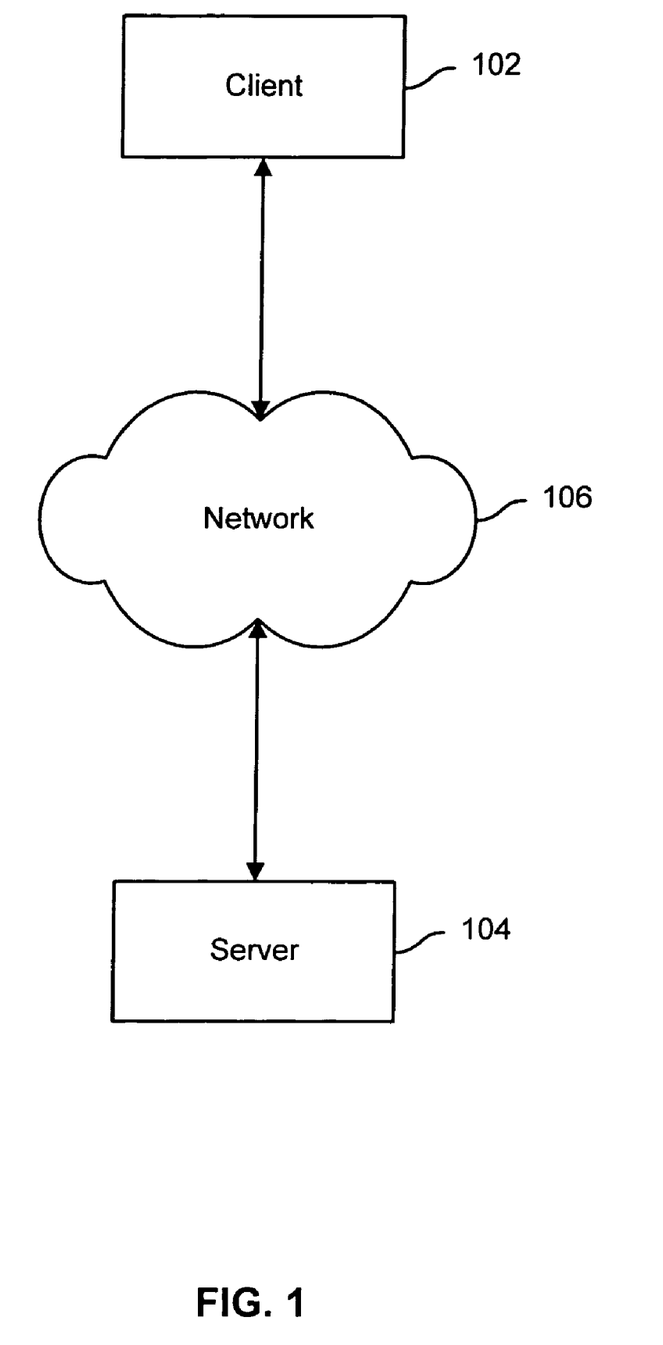
FIG. 1 illustrates an embodiment of a network environment.

FIG. 1 illustrates an embodiment of a network environment. In the example shown, a client 102 communicates with a server 104 via a network 106. Network 106 corresponds to any public or private network, such as a LAN, WAN, the Internet, etc., and facilitates the communication and interchange of information between client 102 and server 104. It may be desirable at client 102 to access data and/or a software program or application available at server 104. For example, it may be desirable at client 102 to access a web page, web site, or web-based application hosted by server 104. A web page or application hosted by server 104 may be accessed at client 102, for example, by entering an associated URL into a browser, via an associated hyperlink to the desired web page or application, via a dedicated client-side program associated with the desired web page or application, etc. In response, in some embodiments, an at least initial definition associated with the desired web page or application, such as an associated user interface and/or its associated data, is provided to client 102 by server 104. In some embodiments, a web page or application that is hosted by server 104 may at least in part include client-side code, and in such cases the client-side code is provided to requesting client 102 by server 104 for execution at the client-side.

Data associated with a desired web page or application may be provided to client 102 by server 104 and/or may at least in part be supplied at the client-side, such as, for example, in the form of user input by a user or process of client 102 or from memory or storage associated with client 102. In some embodiments, input data provided at client 102 with respect to a web page or application hosted by server 104 is persisted at server 104 or an associated storage location such as a database based on a data persistency policy associated with server 104 or the particular web page, application, or a session thereof. In some embodiments, security measures such as user authentication techniques are employed to ensure that code and/or data is made available by server 104 only to a valid client 102. In some embodiments, encryption is employed to secure the interchange of information between client 102 and server 104.

Client 102 and server 104 each include appropriate hardware and software components, such as a processor, memory, input/output devices, communications interface, etc. In some embodiments, client 102 includes connection logic for connecting to and exchanging information with server 104. Connection logic may be built into a browser at client 102, included in a client-side program running at client 102 that is associated with a desired page or application hosted by server 104, included (e.g., as browser executable code or script) in an initial page definition data provide to the client by the server in response to a request to retrieve a page (e.g., HTTP GET), included in another software program or application running at client 102, etc. In some embodiments, such connection logic includes logic for requesting and/or receiving client-side code at client 102 from server 104. In some embodiments, connection logic associated with the interchange of code and/or data with server 104 is provided to client 102 by server 104 such as, for example, with an initial definition of a requested page or application. In some embodiments, client 102 includes a dedicated client-side module that includes the connection logic for connecting to and interchanging information with server 104. In some embodiments, the client-side module is included in and/or provided in addition to the page data comprising a requested page. In some embodiments, such a client-side module at client 102 corresponds to a process running on a processor associated with client 102. In some embodiments, client-side code and/or data is requested and/or received from server 104 as and when needed at client 102 via such a client-side module. For example, if a function associated with a page or application received from server 104 is invoked or attempted to be invoked at client 102 and it is determined at client 102 that the function does not exist at client 102, an associated client-side module may facilitate the acquisition of the code associated with the function from server 104 so that the function can be executed at client 102.

Many web pages, web sites, and web-based applications hosted by a server include client-side scripts that are executed, for example, by a web browser or other appropriate software program or application at the client. Such client-side code may be implemented using any appropriate programming paradigm, such as procedural programming, object oriented programming, etc., and may be written using any appropriate programming language, such as C, C++, JavaScript, Python, Perl, etc. Many motivations exist for the inclusion of client-side code in the definition of a web page or application. For instance, it may be desirable to perform at the client-side an operation that requires data and/or code available only at the client so that such information does not have to be supplied to an associated server. It may be desirable to perform at the client operations that include variable content that depend upon factors such as user input from the client or environmental variables such as the date and time. Although it may be possible to perform an operation at an associated server and to send the results of performing the operation at the server back to the client, it may be desirable to offload certain operations to the client so that the server is not burdened with operations that can be handled by the client. Performing an operation at the client may be quicker than receiving from the server the results of performing the operation at the server, for example, because the server might be busy serving multiple clients, because of network traffic, etc. Furthermore, it may be desirable to perform various operations at the client-side so as to avoid or at least reduce the amount of time, bandwidth, and/or security risks associated with interchanging information between the client and server over a network.

As used herein, the term "client-side code" refers to code that is provided by an associated server to a client machine and that exists and is executed at the client machine. Although web pages and/or applications are described in some examples, the techniques described herein may be employed with respect to any code and/or data that is provided from an associated server to be used at a client machine. In some examples, a page received at a client is described as including a user interface. As used herein, the term "user interface" is not limited to a graphical user interface for interacting with a page or application but more generally refers to any mechanism for interaction by a client with an associated server.

Figure 2:
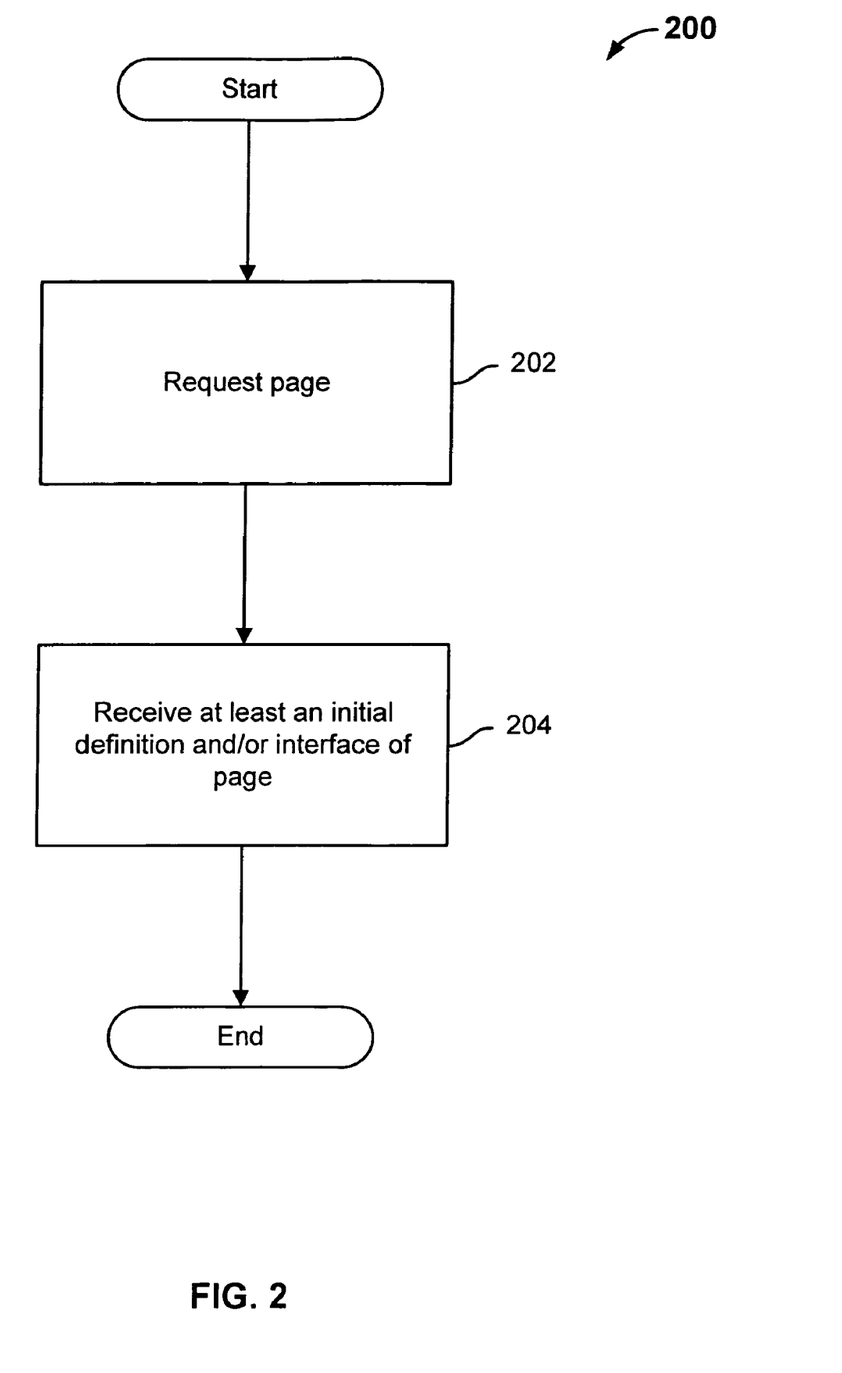
FIG. 2 illustrates an embodiment of a process for receiving an at least initial definition and/or interface of a desired web page or application from a server.

FIG. 2 illustrates an embodiment of a process for receiving an at least initial definition and/or interface of a desired web page or application from a server. In some embodiments, process 200 is employed by a client such as client 102 of FIG. 1. Process 200 starts at 202 at which a page is requested. The page requested at 202 may be associated with, for example, a web site or web-based application hosted by a server, such as server 104 of FIG. 1. A page may be requested at 202 from a server using any appropriate application, program, or technique at a client. For example, a page may be requested at 202 from a server hosting the page or an associated application by entering an associated URL into a browser, via an associated hyperlink to the desired page, via a dedicated client-side program associated with the desired page, etc. At 204, at least an initial definition and/or interface of the page requested at 202 is received, and process 200 ends. In some embodiments, the page received at 204 includes a user interface. Such a user interface may facilitate various functionalities, such as, for example, the ability to input data, select among various options, navigate to other related pages, etc. In some embodiments, the initial definition and/or interface of the page received at 204 includes an associated script. In some embodiments, the page requested at 202 and received at 204 includes client-side executable code and/or references, stubs, and/or function calls associated with client-side executable code not included in and/or provided with the requested page and/or not necessarily yet available at the client.

Client-side code associated with a page, such as the page received at 204 of process 200 of FIG. 2, can be provided to the client by an associated server in various manners. For example, some or all of the client-side code associated with a page may be provided to the client with the requested page, e.g., at 204 of process 200 of FIG. 2. In some cases, the client-side code is included or embedded in the source code of the page. For instance, if the requested page is an HTML page, the client-side code may be included in the HTML file provided in response to a request to retrieve the page (e.g., HTTP GET). In some cases, the source code of a requested page includes references, function calls, and/or object calls to client-side code defined in one or more separate files. In such cases, the one or more separate files that define the client-side code may be provided by the associated server, such as, for example, when the file or code associated with the requested page is provided to the requesting client (e.g., at 204 of process 200 of FIG. 2), and/or may be made available for download from the associated server. For instance, in the aforementioned example of an HTML page, the source code of the HTML page may include references to client-side code defined in or one or more associated script files, and these one or more script files may be provided to the client by the associated server and/or may be made available for download from the associated server. In some embodiments, the client-side code received at a client includes class definitions associated with objects referenced in a requested page. Objects associated with the page may be instantiated using such class definitions at the client. In some cases, when a requested page is received at a client, the source code associated with the page is parsed to determine if it includes references to any external files, functions, and/or objects. If any such code has not already been provided to or is not available at the client, it is requested or downloaded from the associated server so that a complete or nearly complete definition of the page exists at the client-side.

Figure 3:
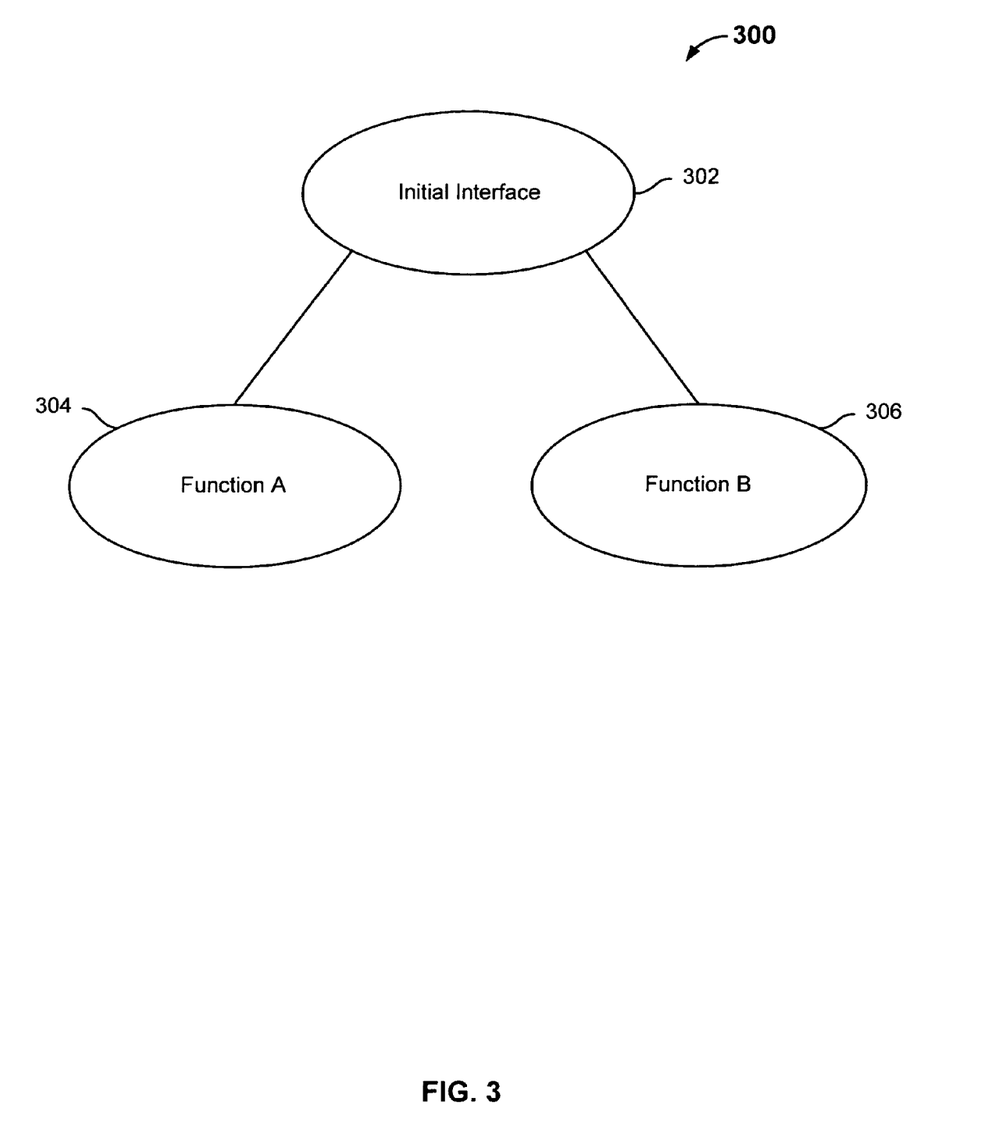
FIG. 3 illustrates an embodiment of an object graph of a page at a client.

FIG. 3 illustrates an embodiment of an object graph of a page at a client. In some embodiments, object graph 300 corresponds to the object graph of a page received at 204 of FIG. 2. In the given example, object graph 300 includes an object 302 associated with an initial interface of a page. Object 302 may include, for example, at least some of the definitions, code, and/or data associated with the various widgets that define a user interface associated with the page. As depicted in object graph 300, object 302 includes references to two external functions, Function A and Function B, that are not defined within object 302. Rather, each of these functions is defined with respect to a separate object. Specifically, Function A is defined by object 304, and Function B is defined by object 306. Function A and Function B are executed at the client-side when invoked. Each of these functions may be invoked, for example, in response to user input or selection of an associated option via the initial interface of the page defined by object 302. The initial interface definition of the desired page (i.e. object 302) and the client-side code associated with the page (i.e. objects 304 and 306) may all be received together or separately at the client as one or more files. In some embodiments, the client-side code associated with the page includes class definitions from which objects 304 and 306 are instantiated at the client-side.

In some embodiments, a complete or nearly complete definition of a page hosted by a server exists at a client when the page is requested and received by the client. In such cases, all or most of the client-side code associated with the page exists at the client-side. As the example of FIG. 3 shows, in such cases, the entire object graph of a page may be populated at the client-side. In some cases, the files, code, data, etc., associated with a requested page are saved on disk at the client and may persist within the file system of the client indefinitely. As a result, the various components associated with the requested page at the client-side may be readily accessible at the client, for example, by a user or process of the client and in some cases for other than their intended use at the client. However, the code and/or data associated with a particular page that exist at the client-side may be proprietary, and it may be desirable to protect information related to the implementation of the page from hostile users who might maliciously use such information, for example, for piracy, authoring a similar page or associated application, creating related extension pages or applications, detecting and exploiting vulnerabilities in the page or associated application, etc. It is, therefore, useful to protect the code and/or data associated with the implementation of a page that exists at the client-side by limiting the accessibility of such information at the client.

In some embodiments, preventing the code and/or data associated with a page from being easily accessed at the client-side is at least in part achieved by providing at least initially by an associated server only a limited definition of a requested page to a client, such as at 204 of process 200 of FIG. 2. In some embodiments, when a page is requested by a client, a shell of the page is provided by the associated server to the client. In some embodiments, such a shell includes only a basic interface and very limited functionality. In some cases, the shell of a page includes an initial user interface associated with the page that facilitates, for example, receiving user input associated with the page, user selection of various options associated with the page, user navigation through content associated with the page or other related pages, etc., at the client. In some embodiments, client-side code associated with a page is not included within the shell (e.g., as part of the code associated with the shell or as one or more separate files) and is not directly available for download from an associated server.

In some embodiments, just enough logic or functionality exists within a shell of a page so that when a particular functionality referenced in the shell is invoked or attempted to be invoked at a client, e.g., when a user selects a corresponding option via the interface associated with the page, the client-side code associated with the functionality is dynamically requested and received by the client from the associated server. Thus, in some embodiments, instead of maintaining a complete or nearly complete definition of a page at the client-side, client-side code associated with a page is received at the client from an associated server in individual pieces or files as and when needed at the client at runtime. In such cases, if some of the client-side code associated with a page is never invoked at a client, the code is never received at the client from the server. In some embodiments, data associated with a page that is needed from a server is similarly dynamically obtained at runtime when needed at the client. In some embodiments, the shell of the requested page, the associated client-side code that is dynamically received at the client at runtime, and/or any associated data exists only in memory (e.g., RAM) at the client and is not persisted in disk or other persistent storage at the client. Thus, in such cases, the code and/or data associated with a requested page is not as readily accessible by a user of the client and has a significantly shorter persistence at the client-side. Since a complete definition of a page does not exist within a few easily accessible files at the client and all pieces of code defining the page may never be received at the client (e.g., if the associated functionality is never invoked at the client), it is difficult, if not impossible, to reconstruct a complete or nearly complete definition of the page and all associated functionality at the client-side by a user of the client, thus, better protecting the possibly proprietary implementation of the page from malicious users.

Figure 4A:
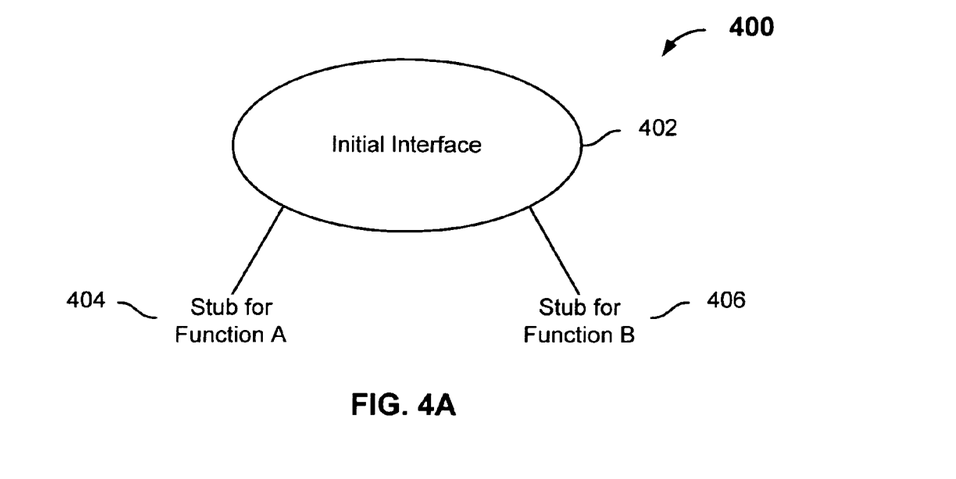
FIG. 4A illustrates an embodiment of an object graph of a page at a client.

FIG. 4A illustrates an embodiment of an object graph of a page at a client. In some embodiments, object graph 400 corresponds to the object graph of a page received at 204 of FIG. 2. In some embodiments, an object graph of a page received at a client corresponds to or is similar to object graph 400 when only a shell of a requested page is at least initially provided to the client by an associated server. Object graph 400 of FIG. 4 parallels object graph 300 of FIG. 3 with the exception that in object graph 400 client-side code is at least initially represented by stubs. Class definitions and/or objects associated with client-side code are not initially provided to or made available to the client but are dynamically requested and received at the client as and when the associated functionalities are invoked at the client. Similar to object graph 300, object graph 400 includes an object 402 associated with an initial interface of the page. Object 402 may include, for example, at least some of the definitions, code, and/or data associated with the various widgets that define a user interface associated with the page. As depicted by object graph 400, object 402 includes references to two external functions, Function A and Function B, which are not defined within object 402. However, unlike the example of FIG. 3, class definitions and/or objects associated with Function A and Function B do not at least initially exist at the client and, thus, the associated objects do not at least initially appear in object graph 400. Rather, stubs serve as place holders for the objects associated with Functions A and B as depicted in object graph 400 of FIG. 4A as stub 404 and stub 406, respectively.

Figure 4B:
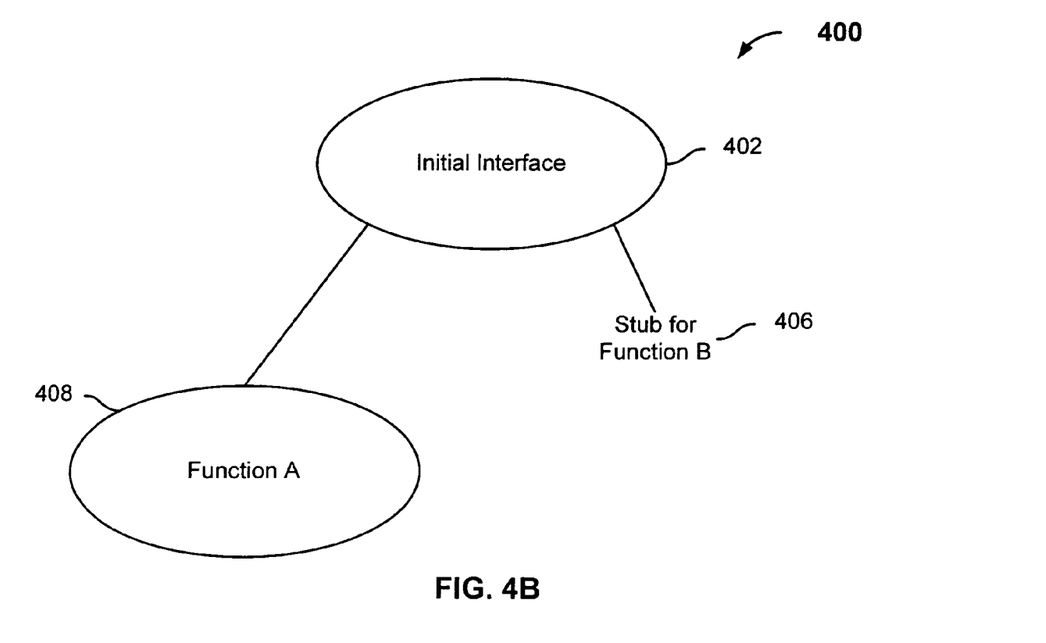
FIG. 4B represents a transition of object graph 400 of FIG. 4A to a state in which stub 404 is replaced by an object 408 associated with Function A.

FIG. 4B represents a transition of object graph 400 of FIG. 4A to a state in which stub 404 has been replaced by (and/or augmented and/or completed to create) an object 408 associated with Function A. In some embodiments, an instance of object 408 associated with Function A is provided by the server to the client when Function A is invoked or is attempted to be invoked at the client. Function A may be invoked or attempted to be invoked at the client, for example, when a user of the client selects an option associated with the execution of Function A via the user interface associated with object 402. In some embodiments, the class definition associated with Function A and/or object 408 is requested by and/or received at the client by a client-side module that includes connection logic associated with communicating with an associated server when code and/or data is needed at the client. In some embodiments, the class definition is not provided, and instead just the code comprising an individual instance, e.g., object 408 in the example shown, is provided. In some embodiments, object 408 exists only in memory and is not cached or otherwise stored persistently at the client. In some embodiments, object 408 is prevented from being cached or otherwise stored persistently at the client at least in part by operation of a connection logic and/or module configured to obtain the object 408 from the server on an as needed basis, as described herein. By storing the object 408 only in memory, the associated code would only be exposed to a highly sophisticated malicious user who had available to him/her and knew how to use a network communication "sniffer" or other tool usable to intercept and decode the network communications used to send the code comprising object 408, for example, from the server to the client. Although not depicted in FIG. 4B, if in a similar manner Function B were invoked or attempted to be invoked at the client, code comprising and/or required to generate or complete at the client an object configured to perform Function B would be requested and received from an associated server, and the object graph associated with the received page would include an object for Function B in place of stub 406. However, if Function B were never invoked at the client, the corresponding class definition and/or object in some embodiments would never be requested and/or received at the client, thereby protecting the associated code from unnecessary risk of disclosure, even to a sophisticated malicious user.

Figure 5:
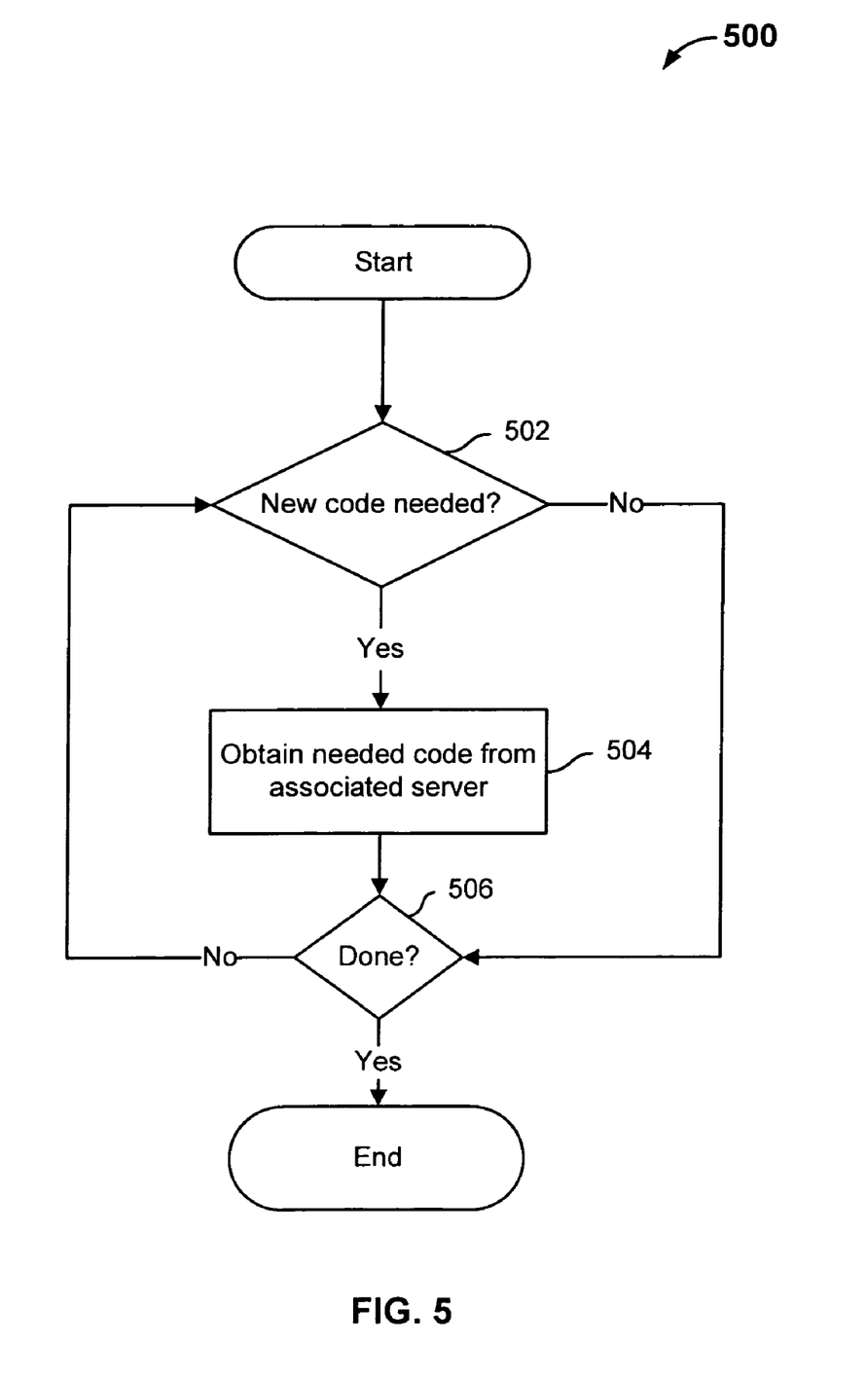
FIG. 5 illustrates an embodiment of a process for obtaining code associated with a page.

FIG. 5 illustrates an embodiment of a process for obtaining code associated with a page. In some embodiments, process 500 is employed by a client such as client 102 of FIG. 1. In some embodiments, process 500 is employed to obtain from a server client-side code associated with a page obtained from the server. In some embodiments, a client-side module and/or connection logic implements the process of FIG. 5. In some embodiments, the client-side module is downloaded from the server from which a page with which client-side code not include in or with the page when first requested is retrieved. In various embodiments, the client-side module is included in the page, sent with the page, or obtained from the server before or after the page is requested. Process 500 starts at 502 at which it is determined whether any new code associated with a page obtained from a server is needed. In some embodiments, it is determined at 502 that new code associated with a page is needed when an indication is received that the associated code is desired to be executed at the client. Such an indication may be received with respect to an associated page, for example, in response to the invocation of a function, selection of an option, input of data, etc., when the associated code does not already exist at the client. In some embodiments, an indication is received at 502 that new code is needed when a request for the code is received from a stub associated with the code. For example, if the stub is associated with an object and the code associated with the object is desired to be executed at the client, the class definition of the object and/or an instance of the object may be requested by the associated stub. In some embodiments, an indication is received at 502 that new code is needed when a function is called, exception is thrown, or other error generated because the associated code is not defined at the client. If it is determined at 502 that new code is needed, the needed code is obtained from an associated server at 504. In some embodiments, a dedicated client-side module at a client facilitates the acquisition of needed code from an associated server. In some embodiments, the code obtained from the server at 504 is temporarily stored in memory at the client so that the code is not indefinitely persisted at the client and is not as readily accessible to users or processes of the client other than for its intended purpose. Upon obtaining the needed code from an associated server at 504 or if it is determined at 502 that no new code is needed, process 500 continues to monitor for indications that new code is needed until it is determined at 506 that the process 500 is done—e.g., if a page with which process 500 is associated is no longer being displayed—after which process 500 ends. Steps 502 and 504 may be repeated multiple times as and when code is needed at the client-side.

Regardless of the manner in which code associated with a page is obtained at a client, data associated with the page may be obtained in various manners. For example, data associated with a page may be pushed to the client from an associated server; may be requested by and received at the client from an associated server; may be available a the client-side, for example, via user input by a user or process of the client or from memory or storage associated with the client; etc. In some embodiments, process 500 of FIG. 5 is employed to obtain not only code but also data for a page from an associated server, for example, as and when the data is needed at the client-side.

As described above, in some embodiments, an initial definition of a page includes stubs in place of code (e.g., client-side code), and the code associated with the stubs is fetched from an associated server when needed at a client machine. In addition to and/or instead of stubs, a dedicated function can be employed in the initial definition of a page for calling functions associated with client-side code. Invocations of various functions at a client, such as functions associated with client-side code, can be defined with respect to the invocation of such a dedicated function that includes in its arguments the actual function that is desired to be executed. In such cases, the dedicated function facilitates the acquisition of client-side code from an associated server when the associated code is desired to be invoked at the client and executes the code at the client.

Consider, for example, a scripting language such as JavaScript in which all objects inherit from the global Object class. In such cases, for example, a global "do" or other semantically equivalent function can be added to the Object class, and the arguments of such a "do" function can include a function descriptor and any other optional parameters associated with the function identified by the function descriptor. In some embodiments, the arguments may include a parameter associated with an object or object type with respect to which the "do" function is called so that, for example, a version of the desired function that is appropriate for the object type is obtained and/or executed. In the cases where a dedicated function such as the "do" function is employed to call other functions, instead of a desired function being invoked with respect to an object (e.g., myObject.myFunction(parameters)), in some embodiments, the desired function is invoked with respect to the "do" function being invoked with respect to the object (e.g., myObject.do(myFunction, other parameters)). In some embodiments, when invoked, the "do" function attempts to call the function passed to it in its parameters directly, and if the function is not present, the function is requested from an associated server. For example, the "do" function may request the function from an associated client-side module that is responsible for connecting to and interchanging information with an associated server as needed at the client. Upon receiving the implementation for the desired function from an associated server, the "do" function invokes the function on behalf of the object with respect to which the "do" function was invoked. If the implementation of the desired function is not received by the "do" function, for example, due to server time-out or other error, in some embodiments, the "do" function throws an exception or returns an error. If the implementation of the desired function already exists at the client-side (e.g., from a previous call cached in RAM at the client, because it was part of a stub functionality, etc.), the desired function is called directly by the "do" function and does not have to be obtained from the associated server.

Figure 6:
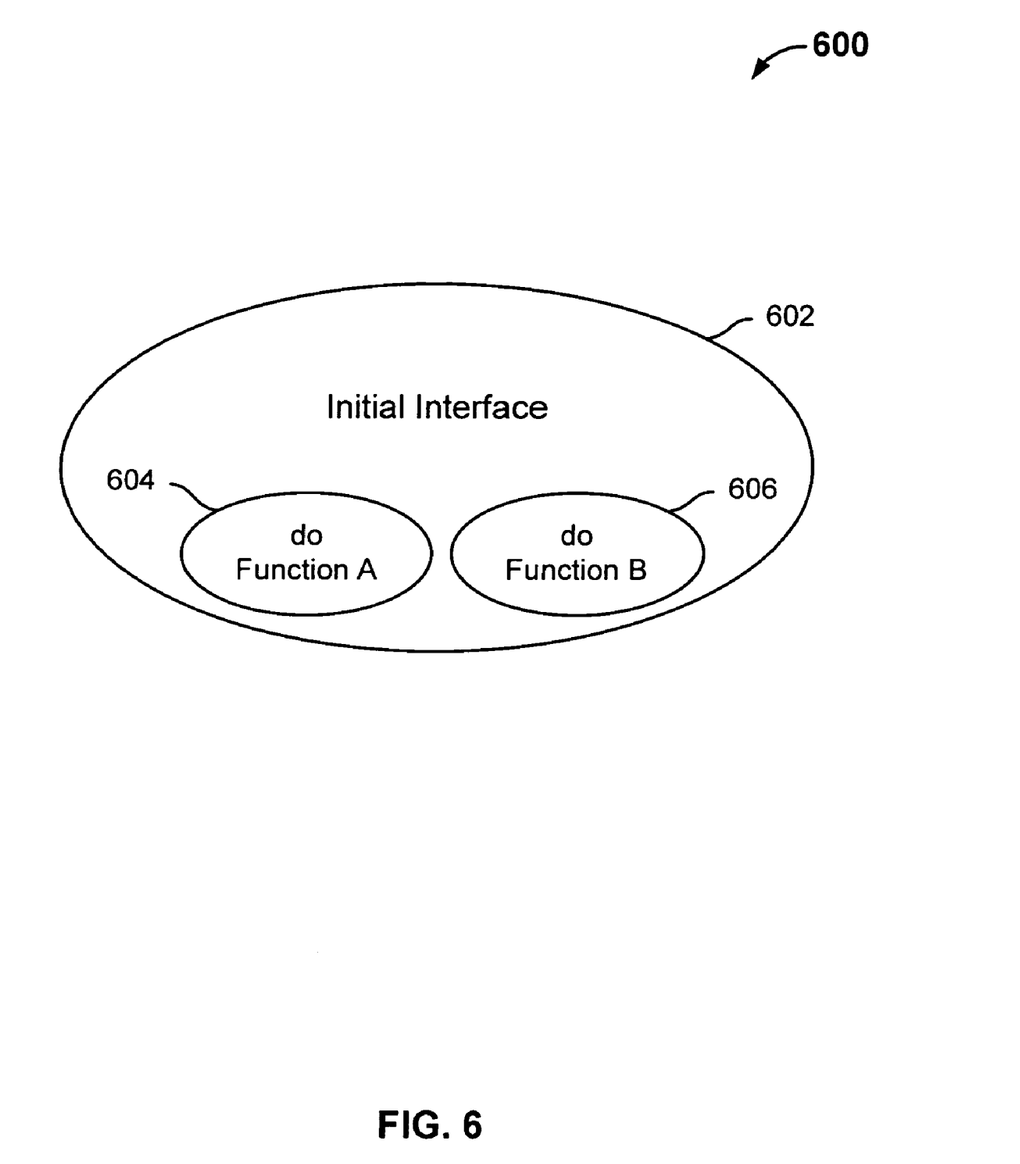
FIG. 6 illustrates an embodiment of an object graph of a page at a client.

FIG. 6 illustrates an embodiment of an object graph of a page at a client. In some embodiments, object graph 600 corresponds to the object graph of a page received at 204 of FIG. 2. In some embodiments, an object graph of a page received at a client corresponds to or is similar to object graph 600 when "do" or another similar function is employed to call client-side code at a client. Object graph 600 of FIG. 6 parallels object graph 300 of FIG. 3 and object graph 400 of FIGS. 4A and 4B with the exception that with respect to object graph 600 client-side code is invoked via "do" functions. Class definitions and/or objects associated with client-side code are not initially provided to or made available to the client but are requested and received via the "do" function as and when the associated functionalities are invoked at the client. Similar to object graphs 300 and 400, object graph 600 includes an object 602 associated with an initial interface of the page. Object 602 may include, for example, at least some of the definitions, code, and/or data associated with the various widgets that define a user interface associated with the page. As depicted by object graph 600, object 602 includes references to two "do" functions, a "do" function 604 associated with Function A and a "do" function 606 associated with Function B. Function A and Function B are not defined within object 602, and class definitions and/or objects associated with Function A and Function B do not at least initially exist at the client. Rather, invocations of Function A and Function B are defined within object 602 with respect to associated "do" functions, 604 and 606, respectively. When the functionality associated with Function A or Function B is desired to be executed at the client, the associated "do" function facilitates the acquisition of the needed code (e.g., class definitions, objects, etc.) and/or the execution of the associated code at the client.

In some embodiments, object 602 includes a single "do" method that is called whenever a specific function (i.e., other than "do") is required to be invoked. When a specific function (e.g., either Function A or Function B in the example shown in FIG. 6) is invoked, the single "do" function looks for the code that implements the method(s) required to perform the specific function and, if the code is not yet present at the client, retrieves the code from the server, thereby extending the object 602 by adding the additional method(s) associated with the invoked specific function.

A dedicated function for invoking functions associated with client-side code, such as the "do" function described above, is not limited to be used with respect to an object or an object-oriented language. For example, a global "do" function may be defined, and a definition of a page may include direct invocations of such a "do" function (e.g., do(myFunction, other parameters)) wherever a client-side function is desired to be executed. Although the given examples has been described with respect to the "do" function, similar techniques can be employed with a semantically equivalent function in any appropriate programming language.

Figure 7:
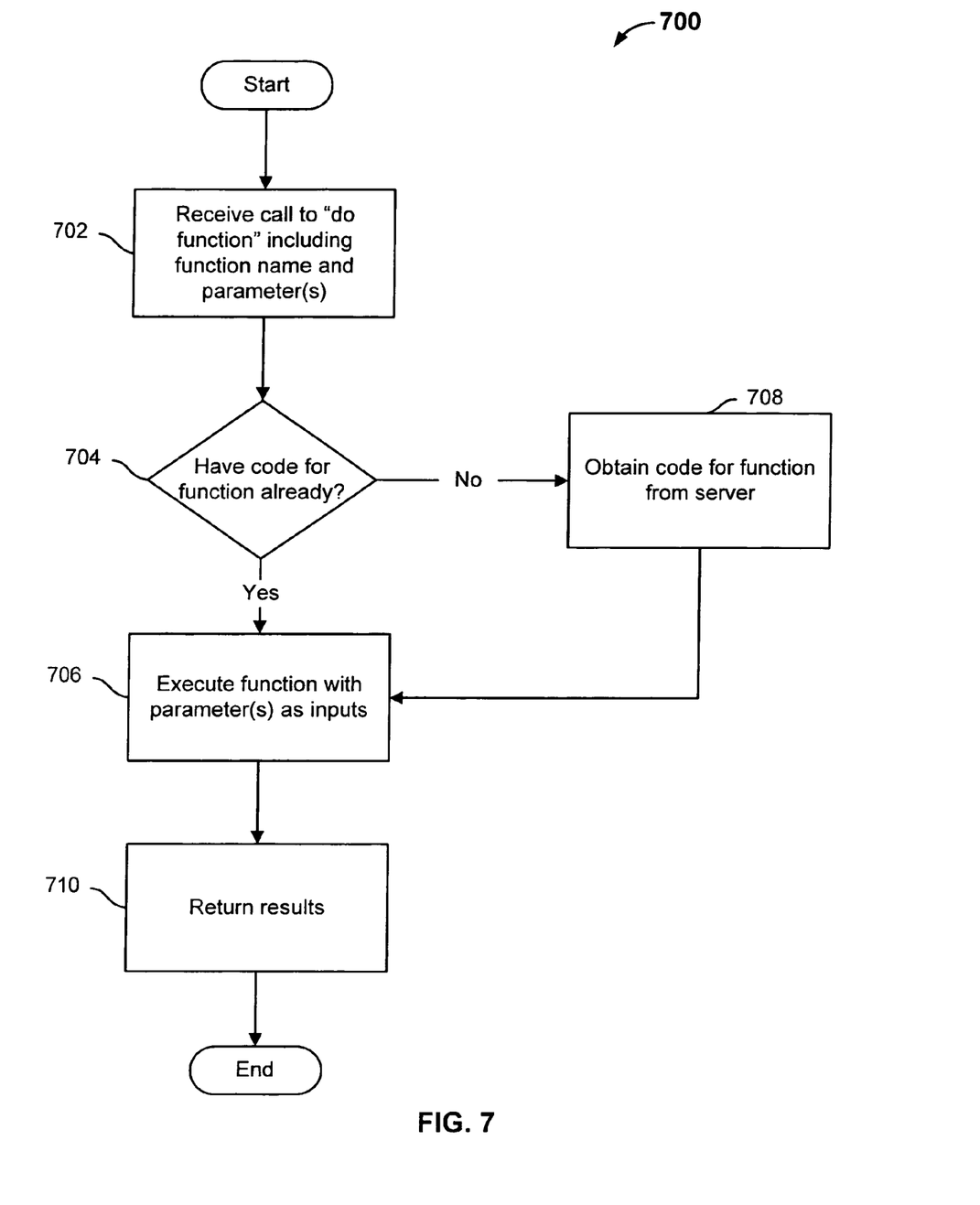
FIG. 7 illustrates an embodiment of a process for executing a desired function at a client.

FIG. 7 illustrates an embodiment of a process for executing a desired function at a client. In some embodiments, process 700 is employed by a client such as client 102 of FIG. 1. In some embodiments, process 700 is associated with the invocation of a "do" function included in a definition of a page that is used to facilitate the execution of a desired function at a client. Process 700 starts at 702 at which a call to a "do" function is received. In some embodiments, a call to a "do" function includes as an argument the name of a desired function which the "do" function facilitates invoking at the client. In some embodiments, the arguments of such a call to a "do" function include one or more other parameters associated with the desired function that are to be used with the execution of the desired function. In some embodiments, the arguments include a parameter associated with an object or object type with respect to which the "do" function is called so that, for example, a version of the desired function that is appropriate for the object type is obtained and/or executed. At 704, it is determined whether the code associated with the desired function with respect to which the "do" function was invoked at 702 already exists at the client. If it is determined at 704 that the code associated with the desired function exists at the client, at 706 the desired function is executed with any associated parameters that were specified at 702 in the call of the "do" function as inputs. If it is determined at 704 that the code associated with the desired function does not exist at the client, the code associated with the desired function is obtained from an associated server at 708, and subsequently at 706 the desired function is executed with any associated parameters that were specified at 702 in the call of the "do" function as inputs. In some embodiments, a dedicated client-side module at a client facilitates the acquisition of needed code from an associated server at 708. In some embodiments, the code obtained from the server at 708 is temporarily stored in memory at the client so that the code is not indefinitely persisted at the client and is not as readily accessible to users or processes of the client other than for its intended purpose. Upon execution of the desired function at 706, the results are returned at 710, and process 700 ends. Process 700 may be repeated multiple times as and when a "do" function included in the definition of a page is encountered when executing code associated with the page at the client-side. Although process 700 has been described with respect to the "do" function, any other appropriate function may be similarly employed to facilitate the acquisition and/or execution of client-side code at a client.

In some embodiments, exception handling is employed at a client to indicate a need for code associated with a page and to obtain the needed code from an associated server. In such cases, for example, code associated with a function referenced within the definition of a page is attempted to be invoked at the client. If the function exists at the client, the function is successfully executed. However, if the function is undefined at the client, an exception is thrown by an exception handler, indicating a need to obtain the code from an associated server. Exception handling can be used with respect to client-side functions or code defined in various manners in the definition of a page. For example, exception handling may be employed with respect to stubs, functions invoked directly (e.g., myFunction(parameters)), functions invoked with respect to objects (e.g., myObject.myFunction(parameters)), functions invoked with respect to a "do" function (e.g., do(myFunction, other parameters)), functions invoked with respect to a "do" function invoked with respect to an object (e.g., myObject.do(myFunction, other parameters)), etc. Although exception handling has been described in the given example, the techniques described herein may be similarly employed with any other appropriate error generating mechanisms.

In some embodiments, a dedicated "do" or similar global function configured to invoke and optionally and/or as applicable pass arguments and/or other parameters to other functions, such as described above, is not required. In some embodiments, the Python script language, or another language that enables customized exception handling, is used. Page data initially provided to a client includes code (e.g., Python script) configured to call one or more specific functions, e.g., in response to a user interaction with an initial user interface which interaction invokes or indicates a need to invoke and/or be able to invoke the function. The call to myObject.myFunction(parameters) in this embodiment results in an error/exception, because the underlying method(s) is/are not defined. The client is configured, e.g., using Python, to invoke custom exception handling code, e.g., associated with the page, a connection module with which the page is associated, a custom browser or other software component, etc., which custom exception handling code is configured to obtain from the server dynamically the code associated with the necessary method(s), which is then used to fulfill the original function call. The fact that Python or similar custom error/exception handling has been invoked in some embodiments is transparent to the user and/or the code or other process that made the function call.

Figure 8:
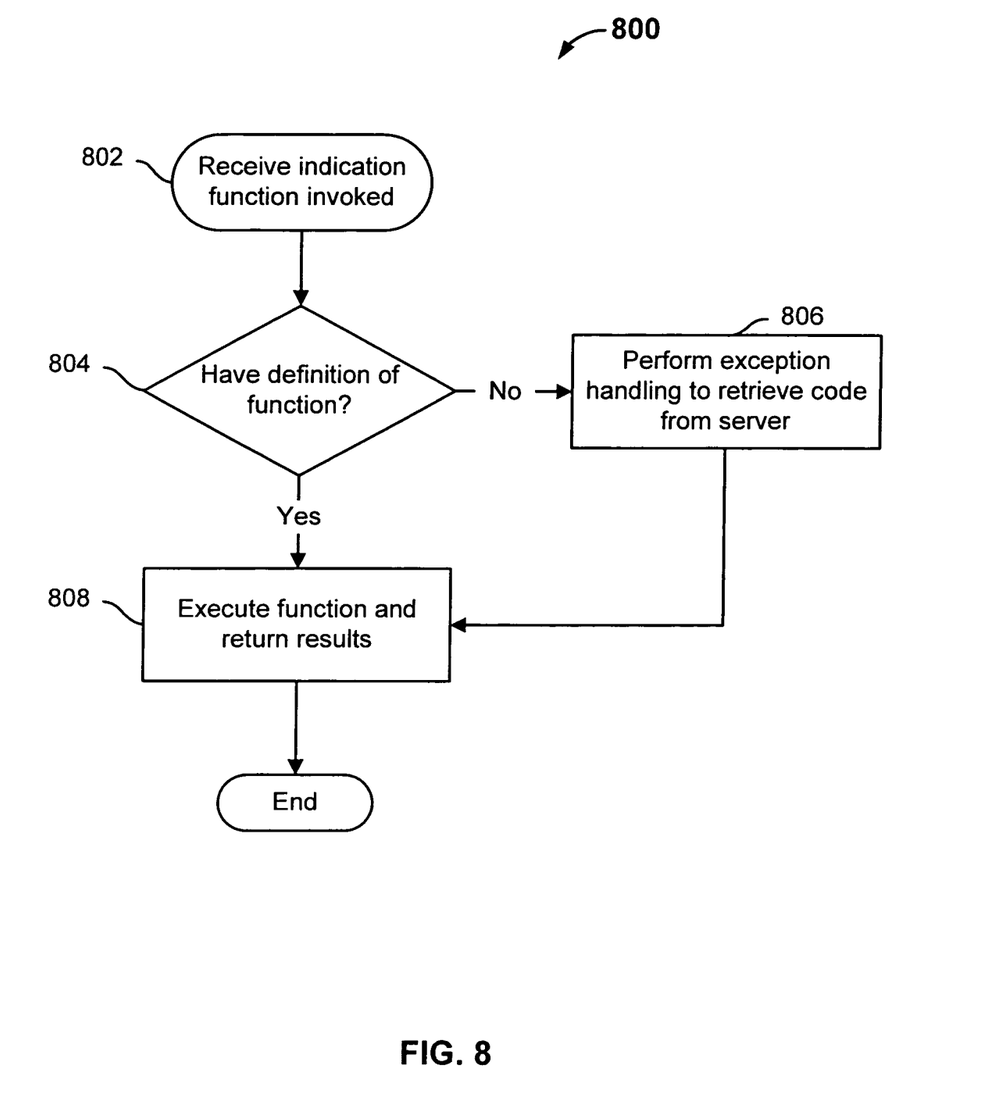
FIG. 8 illustrates an embodiment of a process for executing a desired function at a client.

FIG. 8 illustrates an embodiment of a process for executing a desired function at a client. In some embodiments, process 800 is employed by a client such as client 102 of FIG. 1. In some embodiments, process 800 includes employing exception handling to obtain from a server client-side code associated with a page executing at a client. Process 800 starts at 802 at which an indication is received that a function has been invoked. A function may be invoked, for example, via a stub associated with the function, via a direct invocation of the function, via an object, via a "do" function, via a "do" function associated with an object, etc. It is determined at 804 whether a definition for the function exists. A definition of a function may exist and be at least temporarily cached at a client, for example, from a previous call to the function. If it is determined at 804 that a definition for the function does not exist, exception handling is performed at 806 to retrieve the needed code from an associated server. The functionality associated with exception handling may be defined in any appropriate manner and may depend on the language in which the definition of a page and/or an associated script is implemented. In some embodiments, a dedicated client-side module at a client facilitates the acquisition of needed code from an associated server in response to an exception being thrown at 806. In some embodiments, the code obtained from the server at 806 is temporarily stored in memory at the client so that the code is not indefinitely persisted at the client and is not as readily accessible to users or processes of the client other than for its intended purpose. Upon retrieving the needed code from an associated server at 806 or if it is determined at 804 that a definition for the function does exist, at 808 the function is executed and the associated results are returned. Process 800 subsequently ends. Process 800 may be repeated multiple times as and when a function is encountered when executing code associated with a page at the client-side.

Instead of making the implementation of a page vulnerable to unauthorized use at the client-side by providing client-side code and/or data in a single or a few files that can be easily accessed at the client, in some embodiments only a basic definition or a shell of a desired page is at least initially provided to a client, and various pieces of associated client-side code and/or data are individually provided as and when needed at the client, resulting in improved obfuscation of the possibly proprietary implementation of the page at the client-side, as has been disclosed herein. In some embodiments, code associated with various functionality of a page or an associated application is dynamically obtained at runtime at the client-side when the functionality is desired to be executed and may not be obtained at all if it is never executed at the client-side. In some embodiments, the code and/or data associated with the implementation of a page are never available as downloadable files from an associated server. Rather, when needed at the client, the associated files are obtained from the server and temporarily cached in memory at the client, so that they can not be easily accessed at the client other than for their intended use. Other obfuscation techniques may also be employed to protect client-side code and/or data at a client. For example, before being sent to the client, the code may be parsed to strip out comments and unneeded white spaces and to convert variable and function names to shortened versions. In some cases, encryption or other software obfuscation techniques are employed to make the implementation of a page less decipherable at the client-side. Although the protection of a possibly proprietary implementation of a page serves as one motivation for the techniques described herein, other advantages exist for dynamically providing client-side code as needed to a client. For example, such techniques allow the meshing of code associated with different Dynamic Linked Library (DLL) versions at a client since the implementation of a function associated with any DLL version can be provided to a client. Thus, as described herein, it is useful to dynamically extend to the client from an associated server code and/or data as and when needed for execution at the client-side.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for protecting client-side code associated with a page, comprising:
receiving at a processor a request for the page from a client; and providing to the client an initial definition associated with the page, the initial definition including a call to a dedicated function for facilitating obtaining a piece of client-side code not included in the initial definition and a client-side module configured to dynamically retrieve the piece of client-side code from an associated server at runtime when the piece of client-side code is desired to be executed at the client;

wherein the dedicated function is configured to facilitate obtaining client-side code from the server as needed at the client including by:

searching for at least a portion of the client-side code associated with a desired function at the client such that in the event code associated with the desired function is not present at the client, an error is generated or an exception is thrown that is configured to cause the client-side module to dynamically obtain at runtime the piece of client-side code from the server so that the dedicated function can execute the piece of client-side code at the client, wherein the dedicated function includes arguments associated with the desired function and any parameters associated with the desired function.

2. A method as recited in claim 1, wherein the dedicated function comprises a global function used to obtain any client-side code including the piece of client-side code.

3. A method as recited in claim 1, wherein the dedicated function is invoked with respect to an object with respect to which the piece of client-side code is desired to be executed.

4. A method as recited in claim 1, wherein the dedicated function includes one or more of the following arguments: an identifier associated with the piece of client-side code, an object type with respect to which the dedicated function is invoked, and one or more input parameters associated with the piece of client-side code.

5. A method as recited in claim 4, wherein the identifier comprises a function name associated with the piece of client-side code.

6. A method as recited in claim 1, wherein the dedicated function obtains the piece of client-side code from memory at the client if the piece of client-side code already exists at the client.

7. A method as recited in claim 1, wherein the dedicated function comprises a "do function" in JavaScript.

8. A method as recited in claim 1, wherein the piece of client-side code is obtained from the server in response to the generation of the error.

9. A method as recited in claim 1, further comprising configuring the dedicated function to request the client-side module to obtain the piece of client-side code from the server in response to the generation of the error.

10. A method as recited in claim 9, wherein configuring the dedicated function to request the client-side module to obtain the piece of client-side code from the server in response to the generation of the error comprises including custom exception handling logic.

11. A method as recited in claim 1, wherein the dedicated function includes custom exception handling logic configured to obtain the piece of client-side code.

12. A method as recited in claim 11, wherein the dedicated function causes the client-side module to obtain the piece of client-side code from the server if an exception associated with the piece of client-side code is thrown.

13. A method as recited in claim 12, wherein the exception is thrown if the piece of client-side code does not already exist at the client and the piece of client-side code is attempted to be invoked at the client.

14. A method as recited in claim 1, wherein the initial definition of the page comprises one or more of a user interface and an associated script.

15. A method as recited in claim 1, wherein the initial definition of the page comprises a shell of the page.

16. A method for protecting client-side code associated with a page, comprising:

receiving at a processor of a client a definition of the page, the initial definition including a call to a dedicated function for facilitating obtaining a piece of client-side code not included in the definition and a client-side module configured to dynamically retrieve the piece of client-side code from an associated server at runtime when the piece of client-side code is desired to be executed;

receiving an indication that the piece of client-side code is desired to be executed; and executing the call to the dedicated function to facilitate obtaining the piece of client-side code dynamically from the associated server;

wherein the dedicated function is configured to facilitate obtaining client-side code from the server as needed at the client including by:

searching for at least a portion of the client-side code associated with a desired function at the client such that in the event code associated with the desired function is not present at the client, an error is generated or an exception is thrown that is configured to cause the client-side module to dynamically obtain at runtime the piece of client-side code from the server so that the dedicated function can execute the piece of client-side code, wherein the dedicated function includes arguments associated with the desired function and any parameters associated with the desired function.

17. A method as recited in claim 16, further comprising receiving the piece of client-side code from the associated server and executing the piece of client-side code.

18. A method as recited in claim 16, wherein the client side module is configured to connect to the server and interchange information with the server as needed at the client.

19. A system for protecting client-side code associated with a page, comprising:

a processor associated with a server and configured to:
  receive from a client a request for the page; and
  provide to the client an initial definition associated with the page, the initial definition including a call to a dedicated function for facilitating obtaining a piece of client-side code not included in the initial definition and a client-side module configured to dynamically retrieve the piece of client-side code from the server at runtime when the piece of client-side code is desired to be executed at the client;

wherein the dedicated function is configured to facilitate obtaining client-side code from the server as needed at the client including by:

searching for at least a portion of the client-side code associated with a desired function at the client such that in the event code associated with the desired function is not present at the client, an error is generated or an exception is thrown that is configured to cause the client-side module to dynamically obtain at runtime the piece of client-side code from the server so that the dedicated function can execute the piece of client-side code at the client, wherein the dedicated function includes arguments associated with the desired function and any parameters associated with the desired function; and a memory coupled to the processor and configured to provide instructions to the processor.

20. A system as recited in claim 19, wherein the dedicated function comprises a global function used to obtain any client-side code including the piece of client-side code.

21. A system as recited in claim 19, wherein the piece of client-side code is obtained from the server in response to the generation of the error.

22. A system as recited in claim 19, wherein the dedicated function includes custom exception handling logic configured to obtain the piece of client-side code.

23. A system as recited in claim 22, wherein the dedicated function causes the client-side module to obtain the piece of client-side code from the server if an exception associated with the piece of client-side code is thrown.

24. A system as recited in claim 19, wherein the client side module is configured to connect to the server and interchange information with the server as needed at the client.

25. A computer program product for protecting client-side code associated with a page, the computer program product being embodied in a non-transitory computer readable medium and comprising computer instructions for:
   receiving from a client a request for the page; and
   providing to the client an initial definition associated with the page, the initial definition including a call to a dedicated function for facilitating obtaining a piece of client-side code not included in the initial definition and a client-side module configured to dynamically retrieve the piece of client-side code from an associated server at runtime when the piece of client-side code is desired to be executed at the client;
   wherein the dedicated function is configured to facilitate obtaining client-side code from the server as needed at the client including by:
   searching for at least a portion of the client-side code associated with a desired function at the client such that in the event code associated with the desired function is not present at the client, an error is generated or an exception is thrown that is configured to cause the client-side module to dynamically obtain at runtime the piece of client-side code from the server so that the dedicated function can execute the piece of client-side code at the client,
   wherein the dedicated function includes arguments associated with the desired function and any parameters associated with the desired function.

26. A computer program product as recited in claim 25, wherein the dedicated function comprises a global function used to obtain any client-side code including the piece of client-side code.

27. A computer program product as recited in claim 25, wherein the dedicated function is invoked with respect to an object with respect to which the piece of client-side code is desired to be executed.

28. A computer program product as recited in claim 25, wherein the dedicated function includes one or more of the following arguments: an identifier associated with the piece of client-side code, an object type with respect to which the dedicated function is invoked, and one or more input parameters associated with the piece of client-side code.

29. A computer program product as recited in claim 25, wherein the dedicated function includes custom exception handling logic configured to obtain the piece of client-side code.

30. A computer program product as recited in claim 29, wherein the dedicated function causes the client-side module to obtain the piece of client-side code from the server if an exception associated with the piece of client-side code is thrown.

31. A method as recited in claim 1, wherein the client side module is configured to connect to the server and interchange information with the server as needed at the client.

32. A computer program product as recited in claim 25, wherein the client side module is configured to connect to the server and interchange information with the server as needed at the client.

* * * * *